United States Patent
Sugie

(10) Patent No.: US 12,244,252 B2
(45) Date of Patent: Mar. 4, 2025

(54) MOTOR DRIVER CIRCUIT FOR LINEAR MOTOR, POSITIONING DEVICE USING THE SAME, AND HARD DISK DEVICE

(71) Applicant: ROHM CO., LTD., Kyoto (JP)

(72) Inventor: Hisashi Sugie, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 126 days.

(21) Appl. No.: 17/987,192

(22) Filed: Nov. 15, 2022

(65) Prior Publication Data

US 2023/0163708 A1 May 25, 2023

(30) Foreign Application Priority Data

Nov. 22, 2021 (JP) .................. 2021-189194

(51) Int. Cl.
- *H02P 25/06* (2016.01)
- *G11B 5/55* (2006.01)
- *H02P 23/14* (2006.01)

(52) U.S. Cl.
CPC ............ *H02P 23/14* (2013.01); *G11B 5/5521* (2013.01); *H02P 25/06* (2013.01)

(58) Field of Classification Search
CPC ................................ H02P 23/14; H02P 25/06
See application file for complete search history.

(56) References Cited

U.S. PATENT DOCUMENTS

| | | | | |
|---|---|---|---|---|
| 5,844,743 A * | 12/1998 | Funches | ............... | G11B 5/022 360/78.04 |
| 5,982,130 A * | 11/1999 | Male | .................. | G11B 19/28 318/400.31 |
| 6,040,671 A * | 3/2000 | Brito | .................. | H02P 6/182 388/912 |
| 6,373,650 B1 * | 4/2002 | Pedrazzini | ............. | G11B 21/12 318/560 |
| 6,570,360 B1 * | 5/2003 | Freeman | ................. | H02P 6/182 318/798 |
| 6,788,490 B2 * | 9/2004 | Schillaci | ............... | G11B 21/083 360/78.04 |
| 7,649,330 B2 * | 1/2010 | Yamashita | ............... | G11B 5/54 318/560 |
| 8,134,318 B2 * | 3/2012 | Ayala, II | .............. | G11B 5/4806 318/400.4 |
| 8,432,775 B2 * | 4/2013 | Miyagoe | .............. | G11B 19/042 360/75 |
| 9,136,787 B2 * | 9/2015 | Li | ............................ | H02P 7/29 |
| 2005/0082996 A1 * | 4/2005 | Luebbe | ................... | G11B 5/54 |

FOREIGN PATENT DOCUMENTS

JP 4707624 B 6/2011

* cited by examiner

*Primary Examiner* — Rina I Duda

(74) *Attorney, Agent, or Firm* — CANTOR COLBURN LLP

(57) ABSTRACT

A motor driver circuit includes: a current detection circuit configured to generate a current detection signal according to a drive current of a motor as an object to be driven; a first amplifier configured to amplify the current detection signal; a second amplifier configured to multiply a voltage across the motor by a gain smaller than 1 and output the multiplied voltage; and a third amplifier configured to generate a back electromotive force detection signal according to a difference between an output of the first amplifier and an output of the second amplifier.

8 Claims, 6 Drawing Sheets

MOTOR DRIVER CIRCUIT FOR LINEAR MOTOR, POSITIONING DEVICE USING THE SAME, AND HARD DISK DEVICE

CROSS-REFERENCE TO RELATED APPLICATION

The present invention claims priority under 35 U.S.C. § 119 to Japanese Application, 2021-189194, filed on Nov. 22, 2021, the entire contents of which being incorporated herein by reference.

TECHNICAL FIELD

The present disclosure relates to a driver circuit for a linear motor.

BACKGROUND

Linear motors (linear actuators) that position target objects are used in various electronic apparatuses and industrial machines. A voice coil motor is one of the linear motors and can control a position of a mover according to a supplied drive current. A drive circuit for the voice coil motor feedback-controls a current flowing through the voice coil motor so as to approach a target current that defines a target position.

In an actuator driver that positions a head of a hard disk, it is possible to switch between a constant current control that stabilizes a current at a target value and a control that stabilizes a back electromotive force at a target value. There is known a circuit that detects a back electromotive force by subtracting a voltage proportional to a current of a motor from a voltage across the motor.

For applications such as hard disks, etc., a power supply voltage of 12 V system is used. Therefore, in the known circuit described above, it is necessary to configure a circuit block for detecting the back electromotive force with high-withstand voltage elements having a withstand voltage higher than 12 V. In particular, in a case where a variable gain is used for detecting the back electromotive force, a circuit area increases when gain switching is implemented with the high-withstand voltage elements.

SUMMARY

Some embodiments of the present disclosure aim to reduce an area of a circuit that detects a back electromotive force.

According to one embodiment of the present disclosure, a motor driver circuit includes: a current detection circuit configured to generate a current detection signal according to a drive current of a motor as an object to be driven; a first amplifier configured to amplify the current detection signal; a second amplifier configured to multiply a voltage across the motor by a gain smaller than 1 and output the multiplied voltage; and a third amplifier configured to generate a back electromotive force detection signal according to a difference between an output of the first amplifier and an output of the second amplifier Arbitrary combinations of the above constituent elements and mutual replacement of the constituent elements and expressions among methods, devices, systems, etc. are also effective as embodiments of the present disclosure. Furthermore, the description in this section (SUMMARY) does not provide all the essential features of the present disclosure, and thus sub-combinations of those described features can also constitute the present disclosure.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
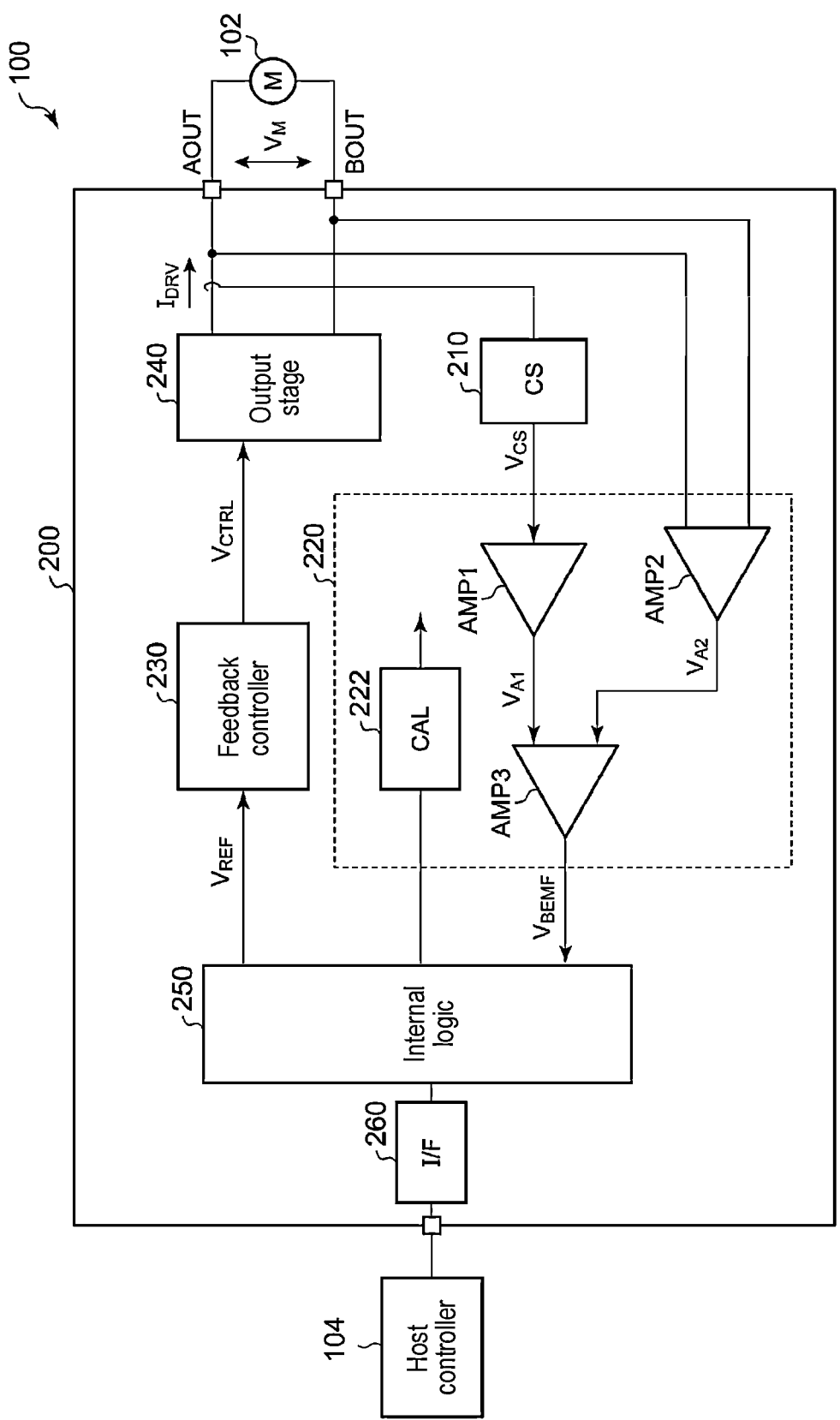
FIG. 1 is a block diagram of a positioning device including a motor driver circuit according to an embodiment.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Overview of Embodiments

An overview of some exemplary embodiments of the present disclosure is described. This overview presents, as a prologue to the detailed description which will be presented later, some concepts of one or more embodiments in simplified forms for the purpose of basic understanding of the embodiments, but it is not intended to limit the scope of the disclosure. This summary is not a comprehensive overview of all possible embodiments, and it is intended to neither identify key elements of all embodiments nor delineate the scope of some or all aspects. For the sake of convenience, "an embodiment" may be used to refer to one embodiment (example or modification) or a plurality of embodiments (examples or modifications) disclosed herein.

A motor driver circuit according to an embodiment includes: a current detection circuit configured to generate a current detection signal according to a drive current of a motor as an object to be driven; a first amplifier configured to amplify the current detection signal; a second amplifier configured to multiply a voltage across the motor by a gain smaller than 1 and output the multiplied voltage; and a third amplifier configured to generate a back electromotive force detection signal according to a difference between an output of the first amplifier and an output of the second amplifier.

A large voltage near a power supply voltage can be generated across the motor. When this large voltage is input to a subtraction amplifier, it is necessary to configure the subtraction amplifier with high-withstand voltage elements. With the above-described configuration, by providing the second amplifier and compressing a DC bias included in the voltage across the motor, a voltage input to the third amplifier, which is the subtraction amplifier, can be reduced. As a result, the third amplifier can be configured with low-withstand voltage elements, thereby reducing an area of the motor driver circuit.

In one embodiment, the second amplifier may include: a first operational amplifier; a first resistor connected between a first input of the first operational amplifier and a first end of the motor; a second resistor connected between a second input of the first operational amplifier and a second end of the motor; a third resistor connected between the first input of the first operational amplifier and an output of the first operational amplifier; and a fourth resistor having one end connected to the second input of the first operational amplifier and the other end receiving a reference voltage.

In one embodiment, the third amplifier may include: a second operational amplifier; a fifth resistor connected between a first input of the second operational amplifier and the output of the second amplifier; a sixth resistor connected between a second input of the second operational amplifier and the output of the first amplifier; a seventh resistor connected between the first input of the second operational amplifier and an output of the second operational amplifier; and an eighth resistor having one end connected to the second input of the second operational amplifier and the other end receiving a reference voltage.

In one embodiment, the motor may a linear motor.

In one embodiment, the linear motor may be a voice coil motor.

In one embodiment, the motor driver circuit may be integrated on one semiconductor substrate. The term "integrated" is intended to include a case where all circuit elements are formed on a semiconductor substrate or a case where main elements of the circuit are integrated on the semiconductor substrate. In addition, some resistors, capacitors, and the like for adjustment of a circuit constant may be provided outside the semiconductor substrate. By integrating a circuit on one chip, a circuit area can be reduced and characteristics of the circuit elements can be kept uniform.

A positioning device according to an embodiment includes: a linear motor; and any one of the above-described motor driver circuits, wherein the motor driver circuits are configured to drive the linear motor.

A hard disk device according to an embodiment includes the above-described positioning device.

Embodiment

An embodiment will be now described with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically and directly connected or even a case where the member A and the member B are indirectly connected through any other member that does not substantially affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not substantially affect an electrical connection state between the members A and C or the members B and C or does not impair function and effects achieved by combinations of the members A and C or the members B and C, in addition to a case where the member A and the member C or the member B and the member C are directly connected.

In addition, the vertical and horizontal axes of a waveform diagram and a time chart shown in the present disclosure are enlarged or reduced as appropriate for ease of understanding, and each waveform shown is also simplified for ease of understanding.

FIG. 1 is a block diagram of a positioning device 100 having a motor driver circuit 200 according to an embodiment. The positioning device 100 includes a linear motor 102, a host controller 104, and the motor driver circuit 200.

The host controller 104 comprehensively controls the positioning device 100. The host controller 104 is configured with, for example, a microcontroller, an FPGA (Field Programmable Gate Array), or an ASIC (Application Specific Integrated Circuit).

The motor driver circuit 200 receives a control command from the host controller 104 and supplies a drive current $I_{DRV}$ of an amount corresponding to the control command to the motor 102. The motor 102 is, for example, a voice coil motor and has a mover displaced by an amount corresponding to the drive current $I_{DRV}$ flowing through the motor 102.

Subsequently, a configuration of the motor driver circuit 200 will be described. FIG. 1 shows blocks related to a speed control for stabilizing a speed of the linear motor 102 at a target value.

The motor driver circuit 200 includes a current detection circuit 210, a back electromotive force detection circuit 220, a feedback controller 230, an output stage 240, an internal logic 250, and an interface circuit 260.

The current detection circuit 210 generates a current detection signal $V_{CS}$ according to the drive current $I_{DRV}$ flowing through the motor 102 as an object to be driven.

The back electromotive force detection circuit 220 generates a back electromotive force detection signal $V_{BEMF}$ indicating a back electromotive force (BEMF) of the motor 102 based on the current detection signal $V_{CS}$ and a voltage $V_M$ across the motor 102. The back electromotive force is proportional to the speed of the motor 102.

The internal logic 250 outputs a current command $V_{REF}$. In a position control mode, the current command $V_{REF}$ changes linearly with respect to a target position of the motor 102. In a speed control mode, the current command $V_{REF}$ is generated so that the back electromotive force detection signal $V_{BEMF}$ approaches a speed command.

The interface circuit 260 can communicate with the host controller 104. The interface circuit 260 may receive information instructing the current command $V_{REF}$ in the position control mode from the host controller 104.

Calculation of the current command $V_{REF}$ in the speed control mode may be performed in the internal logic 250. Alternatively, the interface circuit 260 may be used to transmit electromotive force information back to the host controller 104, and the host controller 104 may generate information instructing the current command so that the back electromotive force approaches the speed command, and send the generated information back to the internal logic 250.

The feedback controller 230 generates, in the position control mode and the speed control mode, a voltage command $V_{CTRL}$ so that the current detection signal $V_{CS}$ approaches the current command $V_{REF}$.

The output stage 240 generates a drive signal according to the voltage command $V_{CTRL}$ and supplies the drive signal to the motor 102. For example, the output stage 240 applies a voltage signal, which is obtained by multiplying the voltage command $V_{CT}$mL by a gain, to the motor 102.

Next, the speed control mode will be described in detail. As described above, in the speed control mode, it is necessary to detect information on the back electromotive force indicating the speed of the motor 102. Therefore, detection of the back electromotive force in the back electromotive force detection circuit 220 will be described.

Figure 2:
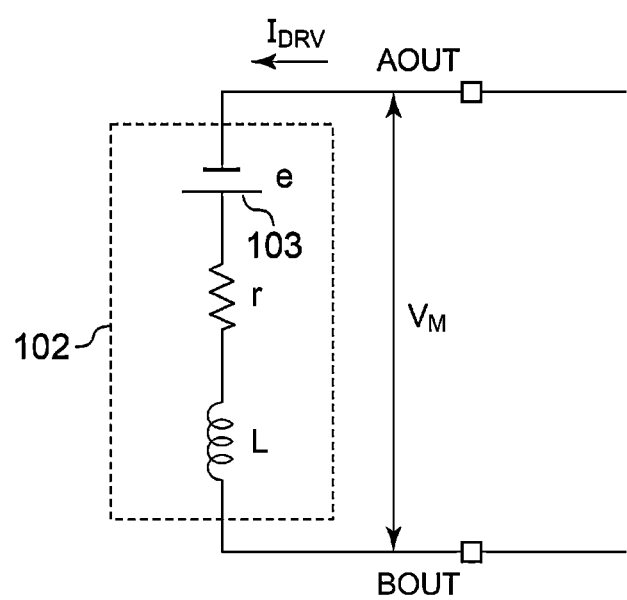
FIG. 2 is an equivalent circuit diagram of a motor.

FIG. 2 is an equivalent circuit diagram of the motor 102. The motor 102 is represented by a coil inductance L, a DC resistance r, and a voltage source 103. The voltage source 103 generates a back electromotive force e proportional to the number of revolutions of the motor 102.

When it can be supposed that a constant drive current $I_{DRV}$ flows through the motor 102, a voltage (electromotive force) across the inductance L is zero and a voltage drop across the resistance r is $r \times I_{DRV}$. Therefore, a voltage $V_M$ across the motor 102 is represented by $V_M = I_{DRV} \times r - e$.

The back electromotive force detection circuit 220 multiplies the current detection signal $V_{CS}$ by an appropriate coefficient to generate a voltage Vr corresponding to $I_{DRV} \times r$. Thereafter, by subtracting the voltage Vr from the voltage $V_M$ across the motor 102, the back electromotive force detection signal $V_{BEMF}$ indicating the back electromotive force e is generated.

Reference is made back to FIG. 1. The back electromotive force detection circuit 220 includes a calibration circuit 222, a first amplifier AMP1, a second amplifier AMP2, and a third amplifier AMP3.

The first amplifier AMP1 amplifies the current detection signal $V_{CS}$ with a gain $g_1$. The second amplifier AMP2 multiplies the voltage across the linear motor 102 by a gain $g_2$ smaller than 1 and outputs the result. For example, the gain $g_2$ may be set to be smaller than ⅛ times.

The third amplifier AMP3 generates the back electromotive force detection signal $V_{BEMF}$ according to a difference between an output $V_{A1}$ of the first amplifier AMP1 and an output $V_{A2}$ of the second amplifier AMP2.

The calibration circuit 222 is active in a calibration mode, and adjusts a circuit constant in the back electromotive force detection circuit 220 so that the back electromotive force detection signal $V_{BEMF}$ becomes zero in a state where a stator of the linear motor 102 is not moved, that is, in a state where the back electromotive force e is zero. For example, the calibration circuit 222 adjusts the gain $g_1$ of the first amplifier AMP1.

The configuration of the motor driver circuit 200 has been described above. Next, an operation of the motor driver circuit 200 will be described.

In the calibration mode, feedback by the feedback controller 230 becomes invalid, and the output stage 240 outputs a sufficiently large drive current $I_{DRV}$ so that the mover of the linear motor 102 can be held down on the mechanical end. As a result, the back electromotive force e becomes zero.

Suppose an internal resistance of the linear motor 102 to be r. In the calibration mode, the output $V_{A1}$ of the first amplifier AMP1 is given by Equation (1). $A_0$ is a gain of the current detection circuit 210.

$$V_{A1} = I_{DRV} \times A_0 \times g_1 \quad (1)$$

Since the back electromotive force is zero in the calibration mode, the voltage across the linear motor 102 is $r \times I_{DRV}$ and the output voltage $V_{A2}$ of the second amplifier AMP2 is given by Equation (2).

$$V_{A2} = g_2 \times r \times I_{DRV} \quad (2)$$

In the calibration mode, the back electromotive force detection signal $V_{BEMF}$, which is an output of the third amplifier AMP3, is represented by Equation (3).

$$V_{BEMF} = g_3 \times (V_{A2} - V_{A1}) \quad (3)$$

$g_3$ is the gain of the third amplifier AMP3.

In the calibration mode, in order to make the back electromotive force detection signal $V_{BEMF}$ to be zero, a relationship of $V_{A2} = V_{A1}$ should be established. That is, the gain $g_1$ is adjusted so that Equation (4) is established.

$$I_{DRV} \times A_0 \times g_1 = g_2 \times r \times I_{DRV} \quad (4)$$

That is, the gain $g_1$ after the adjustment satisfies Equation (5).

$$g_1 = g_2 \times r / A_0 \quad (5)$$

Suppose that, in a normal operating state after the calibration, the back electromotive force e is generated in the linear motor 102. The output $V_{A2}$ of the second amplifier AMP2 at this time is represented by Equation (6).

$$V_{A2} = g_2 \times r \times I_{DRV} - e \quad (6)$$

The back electromotive force detection signal $V_{BEMF}$, which is the output of the third amplifier AMP3 at this time, is represented by Equation (7).

$$V_{BEMF} = g_3 \times (V_{A2} - V_{A1}) = g_3 \times (g_2 \times r \times I_{DRV} - e - I_{DRV} \times A_0 \times g_1) \quad (7)$$

Here, when $g_1$ is adjusted so as to satisfy Equation (5) by pre-calibration, the back electromotive force detection signal $V_{BEMF}$ is represented by Equation (8).

$$V_{BEMF} = g_3 \times (g_2 \times r \times I_{DRV} - e - I_{DRV} \times A_0 \times g_1) = -g_3 \times e \quad (8)$$

As described above, the back electromotive force detection circuit 220 of the motor driver circuit 200 can generate the back electromotive force detection signal $V_{BEMF}$ proportional to the back electromotive force e.

The operation of the motor driver circuit 200 has been described above. Next, a specific configuration example of the back electromotive force detection circuit 220 will be described.

Example 1

Figure 3:
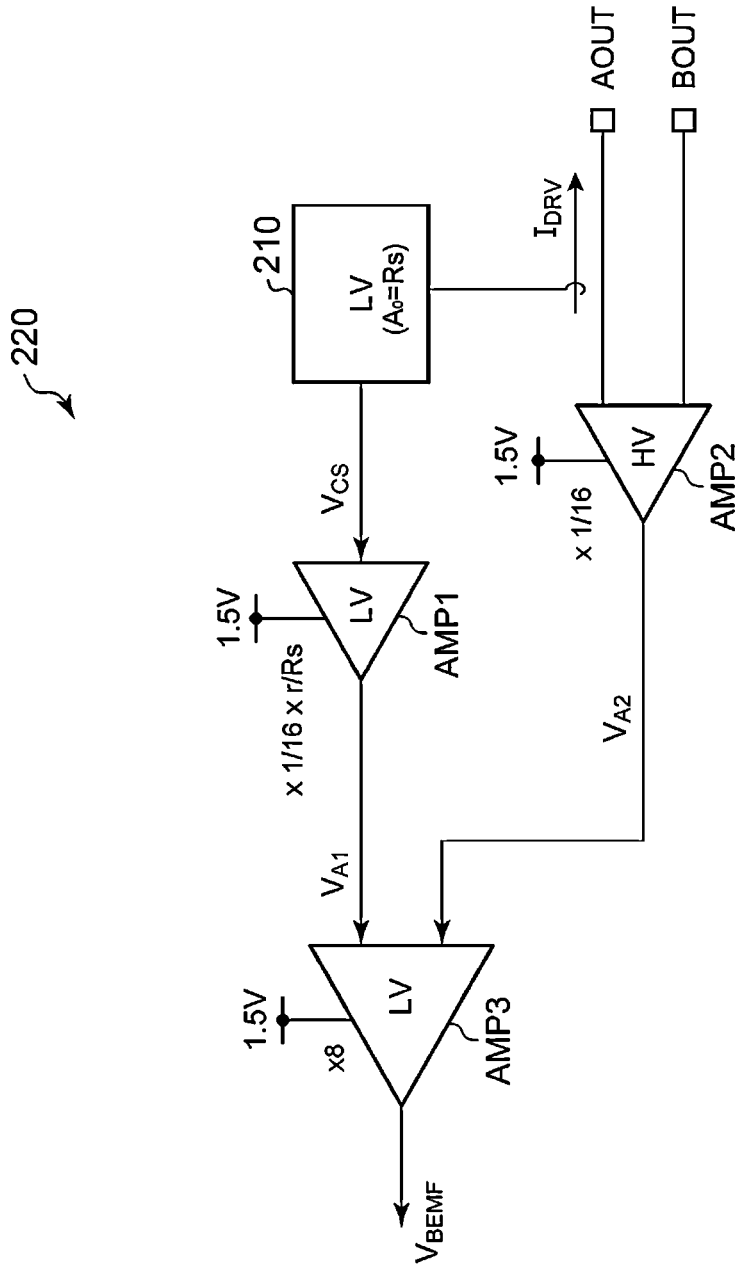
FIG. 3 is a block diagram of a back electromotive force detection circuit according to Example 1.

FIG. 3 is a block diagram of the back electromotive force detection circuit 220 of FIG. 1. FIG. 3 shows a power supply voltage of each block and a withstand voltage of a transistor forming each block. LV indicates that a block is configured with low-withstand voltage elements, and HV indicates that a block is configured with high-withstand voltage elements. For example, LV indicates a device capable of operating within a range of 0 V to 5 V, and HV indicates a device capable of operating within a range of 5 V to 15 V. In Example 1, the power supply voltage $V_{DD}$ is 1.5 V.

The gain of the second amplifier AMP2 is $g_2 = 1/16$, for example. When the voltage $V_M$ across the motor varies from −10 V to +10 V, the voltage across the motor is compressed to −0.6 V to +0.6 V in the output voltage $V_{A2}$ of the second amplifier AMP2. The second amplifier AMP2 is configured with low-withstand voltage elements.

The current detection circuit 210 includes a sense resistor $R_S$ provided on a path of the drive current $I_{DRV}$, and an amplifier that converts a voltage drop across the sense resistor $R_S$ into the current detection signal $V_{CS}$. When the gain of this amplifier is 1, the gain $A_0$ of the current detection circuit 210 is equal to $R_S$.

For example, when $R_S$=0.22 ohm and the driving current $I_{DR}V$ is 0.78 A to 4.55 A, the current detection signal $V_{CS}$ can fall within a range from 0.17 V to 1.0 V. The first amplifier AMP1 that amplifies the current detection signal $V_{CS}$ is configured with low-withstand voltage elements. The gain $g_1$ of the first amplifier AMP1 is adjusted by calibration. The gain $g_1$ after the adjustment satisfies the following equation.

$$g_1 = g_2 \times r/R_S$$

The gain $g_1$ corresponds to the internal resistance r of the motor 102. Supposing that r is within a range of 2.1 ohm to 12.2 ohm, the gain $g_1$ is within a range of 0.6 to 3.48. The output voltage $V_{A1}$ of the first amplifier AMP1 is approximately 0.6 V.

The third amplifier AMP3 is configured with low-withstand voltage elements. The gain $g_3$ of the third amplifier AMP3 can be eight times, for example.

Example 2

Figure 4:
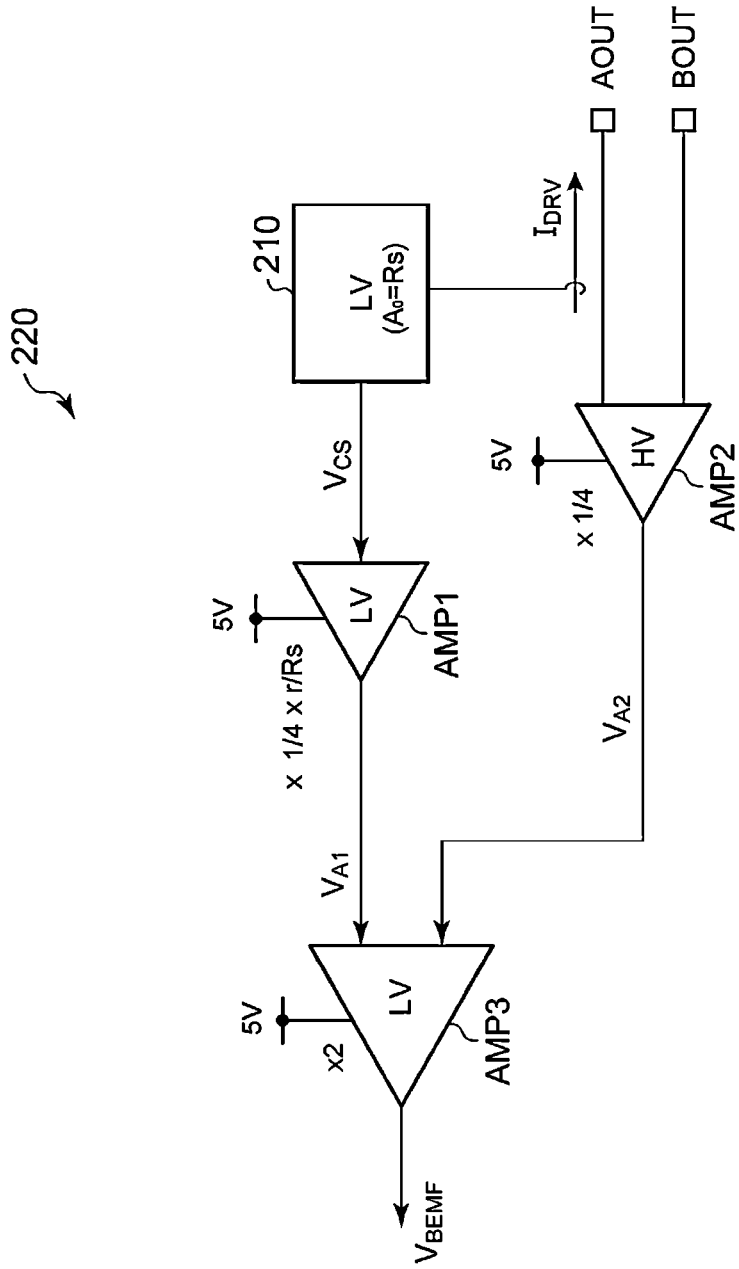
FIG. 4 is a block diagram of a back electromotive force detection circuit according to Example 2.

FIG. 4 is a block diagram of a back electromotive force detection circuit 220 according to Example 2. In Example 2, the power supply voltage $V_{DD}$ is 5 V. The gain of the second amplifier AMP2 is $g_2$=¼, for example. When the voltage $V_M$ across the motor varies from −9 V to +9 V, the voltage across the motor is compressed to −2.25 V to +2.25 V in the output voltage $V_{A2}$ of the second amplifier AMP2. The second amplifier AMP2 is configured with low-withstand voltage elements.

When $R_S$=0.22 ohm and the driving current $I_{DRV}$ is 0.73 A to 4.26 A, the current detection signal $V_{CS}$ can fall within a range of 0.16 V to 0.94 V. The first amplifier AMP1 that amplifies the current detection signal $V_{CS}$ is configured with low-withstand voltage elements. The gain $g_1$ of the first amplifier AMP1 is adjusted by calibration. The gain $g_1$ after the adjustment satisfies the following equation.

$$g_1 = g_2 \times r/R_S$$

The gain $g_1$ follows the internal resistance r of the motor 102. Supposing that r is within a range of 2.1 ohm to 12.2 ohm, the gain $g_1$ is within a range of 2.4 to 13.92. The output voltage $V_{A1}$ of the first amplifier AMP1 is 2.25 V, which is approximately four times that of Example 1.

The third amplifier AMP3 is configured with low-withstand voltage elements. The gain $g_3$ of the third amplifier AMP3 can be doubled, for example.

In Example 1, the gain $g_2$ of the second amplifier AMP2 is 1/16. When the gain $g_2$ is small, accuracy of detecting the back electromotive force is significantly affected by an error of the current detection signal $V_{CS}$. In Example 2, the gain $g_2$ of the second amplifier AMP2 is ¼, which is four times that of Example 1. Thus, the detection accuracy of the back electromotive force is less likely to be affected by the error of the current detection signal.

The configuration of the back electromotive force detection circuit 220 has been described above. In this back electromotive force detection circuit 220, the third amplifier AMP3 can be configured with low-withstand voltage elements. This makes it possible to reduce the area of the back electromotive force detection circuit 220 and, in turn, the area of the motor driver circuit 200.

There are cases where it is desired to make the gain $g_3$ of the third amplifier AMP3 variable according to a platform or use of the linear motor 102. In order to change the gain, a resistor network and a plurality of switches are required. When the third amplifier AMP3 is configured with high-withstand voltage elements, it is necessary to configure the switches with high-withstand voltage transistors, which causes an increase in the area of the third amplifier AMP3.

In the back electromotive force detection circuit 220 of FIG. 3 or 4, even when the gain of the third amplifier AMP3 is variable, the switches can be configured with low-withstand voltage transistors. Thus, the circuit area can be reduced. Further, although the back electromotive force detection circuit 220 is additionally provided with the second amplifier AMP2 configured with high-withstand voltage elements, the gain of the second amplifier AMP2 may be fixed. Thus, a switch for switching the gain is unnecessary. Therefore, the effect of reducing the area of the third amplifier AMP3 exceeds the increase in area by the second amplifier AMP2.

Figure 5:
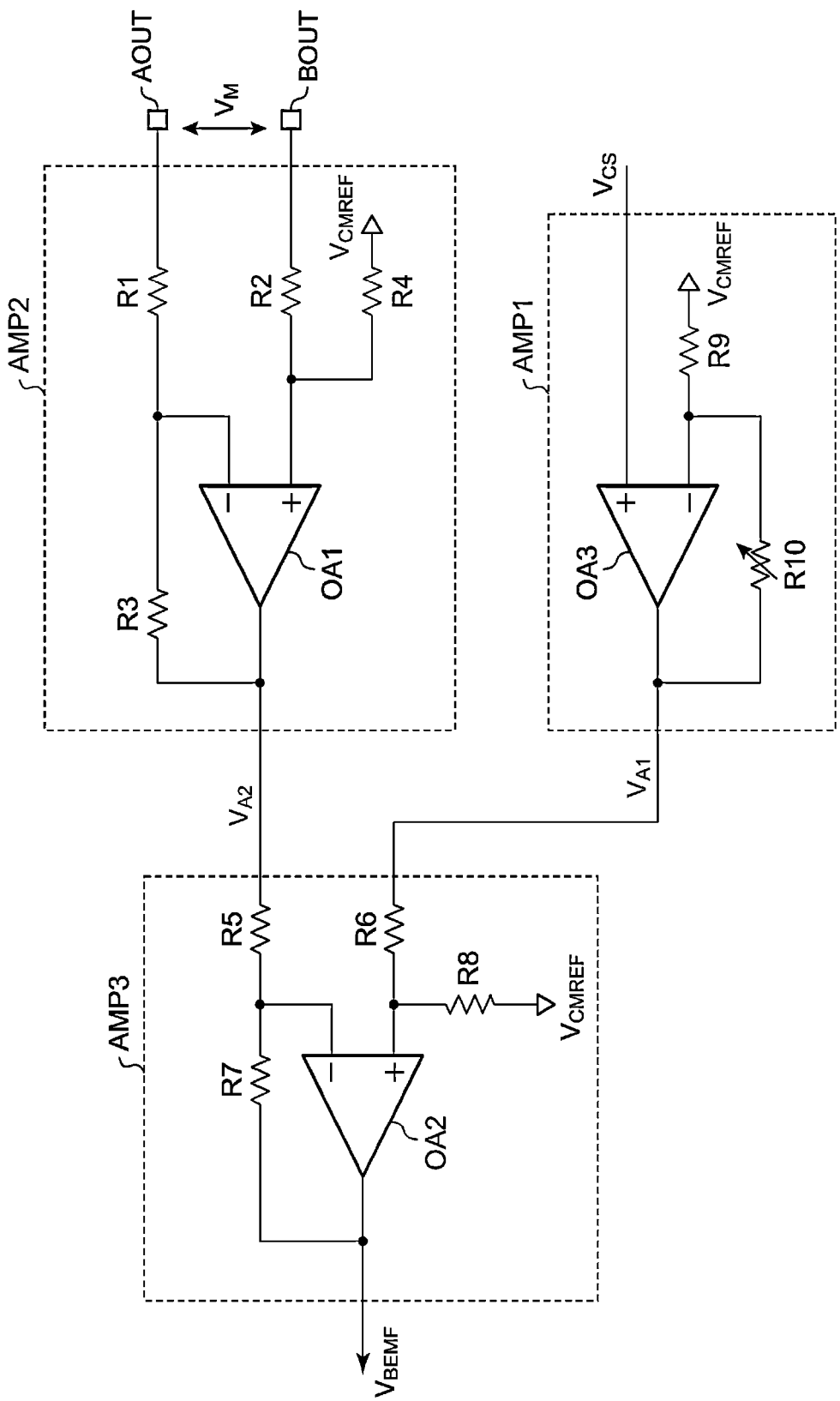
FIG. 5 is a circuit diagram showing a configuration example of a back electromotive force detection circuit.

FIG. 5 is a circuit diagram showing a configuration example of the back electromotive force detection circuit 220. The first amplifier AMP1 includes a third operational amplifier OA3, a ninth resistor R9, and a tenth resistor R10. A reference voltage $V_{CMREF}$ is input to one end of the ninth resistor R9, and the other end of the ninth resistor R9 is connected to an inverting input terminal of the third operational amplifier OA3. The tenth resistor R10 is connected between the inverting input terminal and an output of the third operational amplifier OA3. The output voltage $V_{A1}$ of the first amplifier AMP1 is represented by equation (9).

$$V_{A1} = V_{CS} \times (R9+R10)/R9 + V_{CMREF} \quad (9)$$

The second amplifier AMP2 includes a first operational amplifier OAT and first to fourth resistors R1 to R4. The first resistor R1 is connected between a first input (−) of the first operational amplifier OAT and a first end (AOUT) of the linear motor 102. The second resistor R2 is connected between a second input (+) of the first operational amplifier OAT and a second end (BOUT) of the linear motor 102. The third resistor R3 is connected between the first input (−) of the first operational amplifier OAT and an output of the first operational amplifier OA1. The fourth resistor R4 has one end connected to the second input (+) of the first operational amplifier OAT and the other end receiving the reference voltage $V_{CMREF}$. The output voltage $V_{A2}$ of the second amplifier AMP2 is represented by Equation (10). Here, it is supposed that R1=R2 and R3=R4.

$$V_{A2} = V_M \times R3/R1 + V_{CMREF} \quad (10)$$

The third amplifier AMP3 includes a second operational amplifier OA2 and fifth to eighth resistors R5 to R8, and is configured similarly to the second amplifier AMP2. When a relationship of R5=R6 and R7=R8 is established, the output voltage $V_{BEMF}$ of the third amplifier AMP3 is represented by Equation (11).

$$V_{BEMF} = (V_{A1} - V_{A2}) \times R7/R5 + V_{CMREF} \quad (11)$$

The configuration example of the back electromotive force detection circuit 220 has been described above.

Applications

Figure 6:
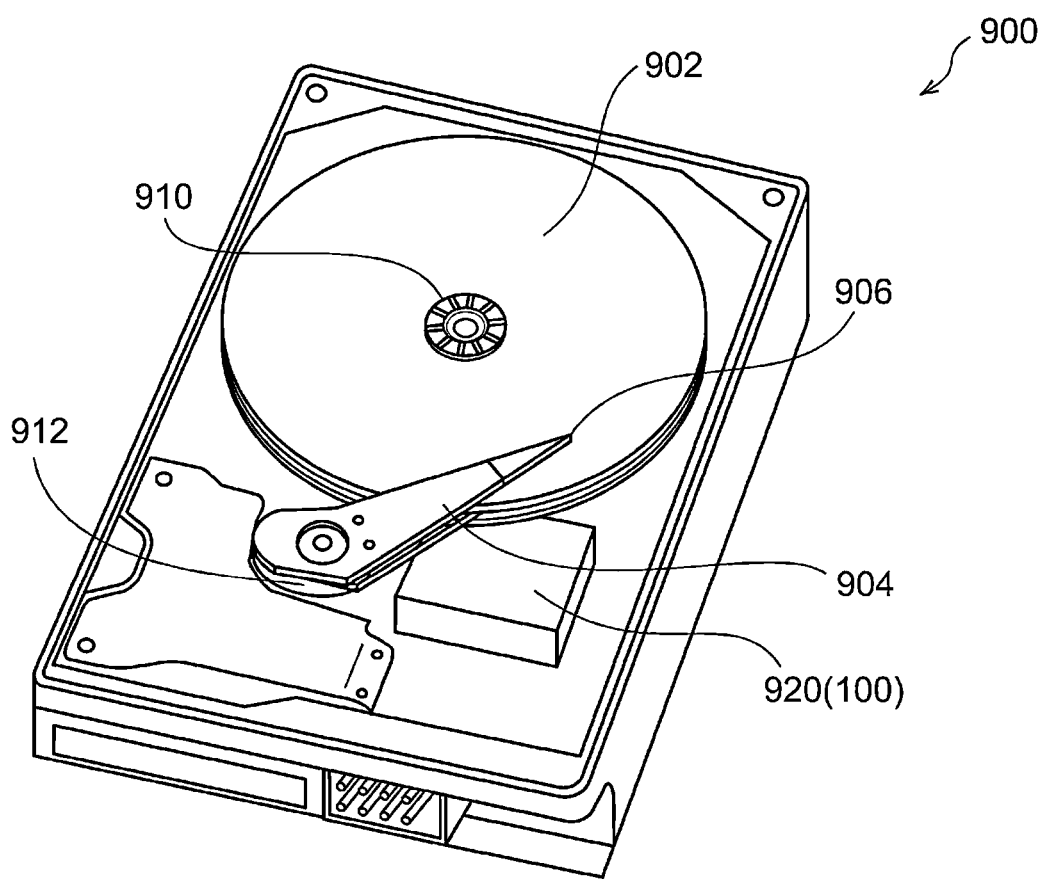
FIG. 6 is a view showing a hard disk device including a motor driver circuit.

FIG. 6 is a view showing a hard disk device 900 including the motor driver circuit 200. The hard disk drive 900 includes a platter 902, a swing arm 904, a head 906, a spindle motor 910, a seek motor 912, and a motor driver circuit 920. The motor driver circuit 920 drives the spindle motor 910 and the seek motor 912.

The seek motor 912 is a voice coil motor. The motor driver circuit 200 according to the embodiment is incorporated in the motor driver circuit 920 and drives the seek motor 912.

In the present disclosure, the configuration and type of the linear motor as an object to be driven are not particularly limited. For example, the present disclosure can be applied to drive a spring return type voice coil motor and other linear actuators. Alternatively, the motor as an object to be driven may be a spindle motor.

In addition, the application of the positioning device 100 is not limited to hard disk devices, and the positioning device 100 can also be applied to lens positioning mechanisms of cameras and the like.

According to the present disclosure in some embodiments, it is possible to reduce an area of a circuit that detects a back electromotive force.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A motor driver circuit comprising:
   a current detection circuit configured to generate a current detection signal according to a drive current of a motor as an object to be driven;
   a first amplifier configured to amplify the current detection signal;
   a second amplifier configured to multiply a voltage across the motor by a gain smaller than 1 and output the multiplied voltage;
   a third amplifier configured to generate a back electromotive force detection signal according to a difference between an output of the first amplifier and an output of the second amplifier; and
   a calibration circuit configured to adjust a gain of the first amplifier such that the output of the first amplifier and the output of the second amplifier have a same voltage in a calibration mode where the motor does not move.

2. The motor driver circuit of claim 1, wherein the second amplifier includes:
   a first operational amplifier;
   a first resistor connected between a first input of the first operational amplifier and a first end of the motor;
   a second resistor connected between a second input of the first operational amplifier and a second end of the motor;
   a third resistor connected between the first input of the first operational amplifier and an output of the first operational amplifier; and
   a fourth resistor having one end connected to the second input of the first operational amplifier and the other end receiving a reference voltage.

3. The motor driver circuit of claim 1, wherein the third amplifier includes:
   a second operational amplifier;
   a fifth resistor connected between a first input of the second operational amplifier and the output of the second amplifier;
   a sixth resistor connected between a second input of the second operational amplifier and the output of the first amplifier;
   a seventh resistor connected between the first input of the second operational amplifier and an output of the second operational amplifier; and
   an eighth resistor having one end connected to the second input of the second operational amplifier and the other end receiving a reference voltage.

4. The motor driver circuit of claim 1, wherein the motor is a linear motor.

5. The motor driver circuit of claim 4, wherein the linear motor is a voice coil motor.

6. The motor driver circuit of claim 1, wherein the motor driver circuit is integrated on one semiconductor substrate.

7. A positioning device comprising:
   a linear motor; and
   the motor driver circuit of claim 1, wherein the motor driver circuit is configured to drive the linear motor.

8. A hard disk device comprising:
   a seek motor; and
   the positioning device of claim 7.

* * * * *